(12) United States Patent
Geng et al.

(10) Patent No.: US 7,283,216 B1
(45) Date of Patent: Oct. 16, 2007

(54) DISTRIBUTED FIBER SENSOR BASED ON SPONTANEOUS BRILLUOIN SCATTERING

(75) Inventors: Jihong Geng, Tucson, AZ (US); Shibin Jiang, Tucson, AZ (US); Christine Spiegelberg, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 730 days.

(21) Appl. No.: 10/874,826

(22) Filed: Jun. 22, 2004

(51) Int. Cl.
*G01B 9/02* (2006.01)
(52) U.S. Cl. .................... 356/35.5; 356/477; 356/484
(58) Field of Classification Search .............. 356/35.6, 356/32, 477, 484, 485
See application file for complete search history.

(56) References Cited

U.S. PATENT DOCUMENTS

| 4,107,628 A | 8/1978 | Hill et al. |
| 4,530,097 A | 7/1985 | Stokes et al. |
| 5,170,457 A | 12/1992 | Jen |
| 5,323,415 A | 6/1994 | Quast et al. |
| 5,825,804 A * | 10/1998 | Sai .............................. 374/137 |

FOREIGN PATENT DOCUMENTS

| GB | 2 243 210 A | 10/1991 |
| WO | WO 02/093120 A1 | 11/2002 |

OTHER PUBLICATIONS

H. Izumita et al., Brillouin OTDR Employing Optical Frequency Shifter Using Side-Band Generation Technique with High-Speed LN Phase-Modulator, IEEE Photonics Technology Letters, vol. 8, No. 12, Dec. 1996, pp. 1674-1676.

V. Lecoeuche et al., 20-km Distributed Temperature Sensor Based on Spontaneous Brillouin Scattering, IEEE Photonics Technology Letters, vol. 12, No. 10; Oct. 2000, pp. 1367-1369.

V. Lecoeuche et al., Brillouin based distributed fibre sensor incorporating a mode-locked Brillouin fibre ring laser, Optics Communications 152, Jul. 1, 1998, pp. 263-268.

V. Lecoeuche et al., 25 km Brillouin based single-ended distributed fibre sensor for theshold detection of temperature or strain, Optics Communications 168, Sep. 1, 1999, pp. 95-102.

Ch. Spiegelberg et al., Compact 100 mW fiber laser with 2 kHz linewidth, PD45-1, Optical Fiber Conference 2003.

M. Nikles et al., Simple distributed fiber sensor based on Brillouin gain spectrum analysis, Optics Letters, vol. 21, No. 10, May 15, 1996, pp. 758-760.

J. Robert et al., Potential of Simulated Brillouin Scattering as Sensing Mechanism for Distributed Temperature Sensors, Electronic Letters, Jul. 6, 1989, vol. 25, No. 14, p. 916.

(Continued)

*Primary Examiner*—Hwa (Andrew) Lee
(74) *Attorney, Agent, or Firm*—Eric A. Gifford (57) ABSTRACT

A distributed fiber sensor based on spontaneous Brillouin scattering uses a single-frequency fiber laser as a source and a cw Brillouin fiber ring laser as an OLO to optically shift the frequency of the OLO to set the Brillouin/OLO beat frequency within the bandwidth of a conventional heterodyne receiver. The distributed fiber sensor is capable of real-time measurement of both temperature and strain.

19 Claims, 8 Drawing Sheets

OTHER PUBLICATIONS

T. Horiguchi et al., Tensile Strain Dependence of Brillouin Frequency Shift in Silica Optical Fibers, IEEE Photonics Technology Letters, vol. 1, No. 5, May 1989, pp. 107-108.

P.C. Wait, Spontaneous Brillouin-Based Distributed Temperature Sensor Utilizing a Fiber Bragg Grating Notch Filter for the Separation of the Brillouin Signal, IEEE Photonics Technology Letters, vol. 13, No. 5, May 2001, pp. 508-510.

K. Hotate, Distributed Dynamic Strain Measurement Using a Correlation-Based Brillouin Sensing System, IEEE Photonics Technology Letters, vol. 15, No. 2, Feb. 2003, pp. 272-274.

T.R. Parker et al., Simultaneous Distributed Measurements of Strain and Temperature from Noise Initiated Brillouin Scattering in Optical Fibers, IEEE Journal of Quantum Electronics, vol. 34, No. 4, Apr 1998, pp. 645-659.

C. Spiegelberg et al., Low-Noise Narrow-Linewidth Fiber Laser at 1550 nm (Jun. 2003), Journal of Lightwave Technology, vol. 22, No. 1, Jan. 2004, pp. 57-62.

S. Maughan et al., 57-km single-ended spontaneous Brillouin-based distrbuted fiber temperature sensor using microwave coherent detection, Optics Letters, Mar. 15, 2001, vol. 26, No. 6, pp. 331-333.

X. Bao et al., Experimental and Theoretical Studies on a Distributed Temperature Sensor Based on Brillouin Scattering, Journal of Lightwave Technology, vol. 13, No. 7, Jul. 1995, pp. 1340-1348.

* cited by examiner

|  |  | Approach one Fig.2 | Approach two Fig.3 | Invention |
|---|---|---|---|---|
| Pulse light | source | Mode-locked Brillouin fiber laser | amplitude modulated laser | amplitude modulated laser |
|  | Frequency shift & performance | Brillouin frequency shift | phase modulated sideband | No shift |
|  | intensity stability | good | good | good |
|  | Pulse width | Fixed, > 30 ns | variable | variable |
|  | Pulse shape | uncontrollable | controllable | controllable |
|  | reproducibility | poor | good | good |
| OLO | source | Single frequency laser | Single frequency laser | Single frequency Brillouin fiber laser |

FIG. 9

DISTRIBUTED FIBER SENSOR BASED ON SPONTANEOUS BRILLUOIN SCATTERING

BACKGROUND OF THE INVENTION

1. Field of the Invention

This invention relates to distributed fiber sensors based on spontaneous Brillouin scattering—and more specifically to a distributed fiber sensor that uses a single-frequency laser to generate the pulsed light and a Brillouin fiber ring laser to provide the optical local oscillator (OLO).

2. Description of the Related Art

The application of optical fiber technology to the problem of distributed sensing offers the potential ability to determine a physical parameter such as temperature or strain as a function of the position along an optical fiber cable over lengths up to tens of kilometers. Typically, the measurements are performed using optical time-domain reflectometry (OTDR), which detects pulsed of light backscattered from the optical fiber.

Distributed fiber sensors based on Brillouin scattering have received attention since the Brillouin frequency shift in an optical fiber was found to linearly depend on the fiber strain and temperature in 1989 (T. Horiguchi, T. Kurashima, and M. Tateda, "Tensile Strain Dependence of Brillouin Frequency Shift in Silica Optical Fiber," *IEEE Photonics Technol. Lett.*, 1 (1989), p. 107. D. Culverhouse, F. Farahi, C. N. Pannel, D. A. Jackson, "Potential of Stimulated Brillouin Scattering as Sensing Mechanism for Distributed Temperature Sensors," *Electron. Lett.*, 25 (1989), p. 913.). The main advantage of Brillouin-based fiber sensors over conventional Raman-based systems is that standard telecommunication single mode fiber can be used to measure both temperature and strain simultaneously and unambiguously. Although both the Raman effect and Brillouin effect involve the nonlinear backscattering of the light propagating in an optical fiber, the intensity and frequency shift of the two backscattered components are much different.

Figure 1:
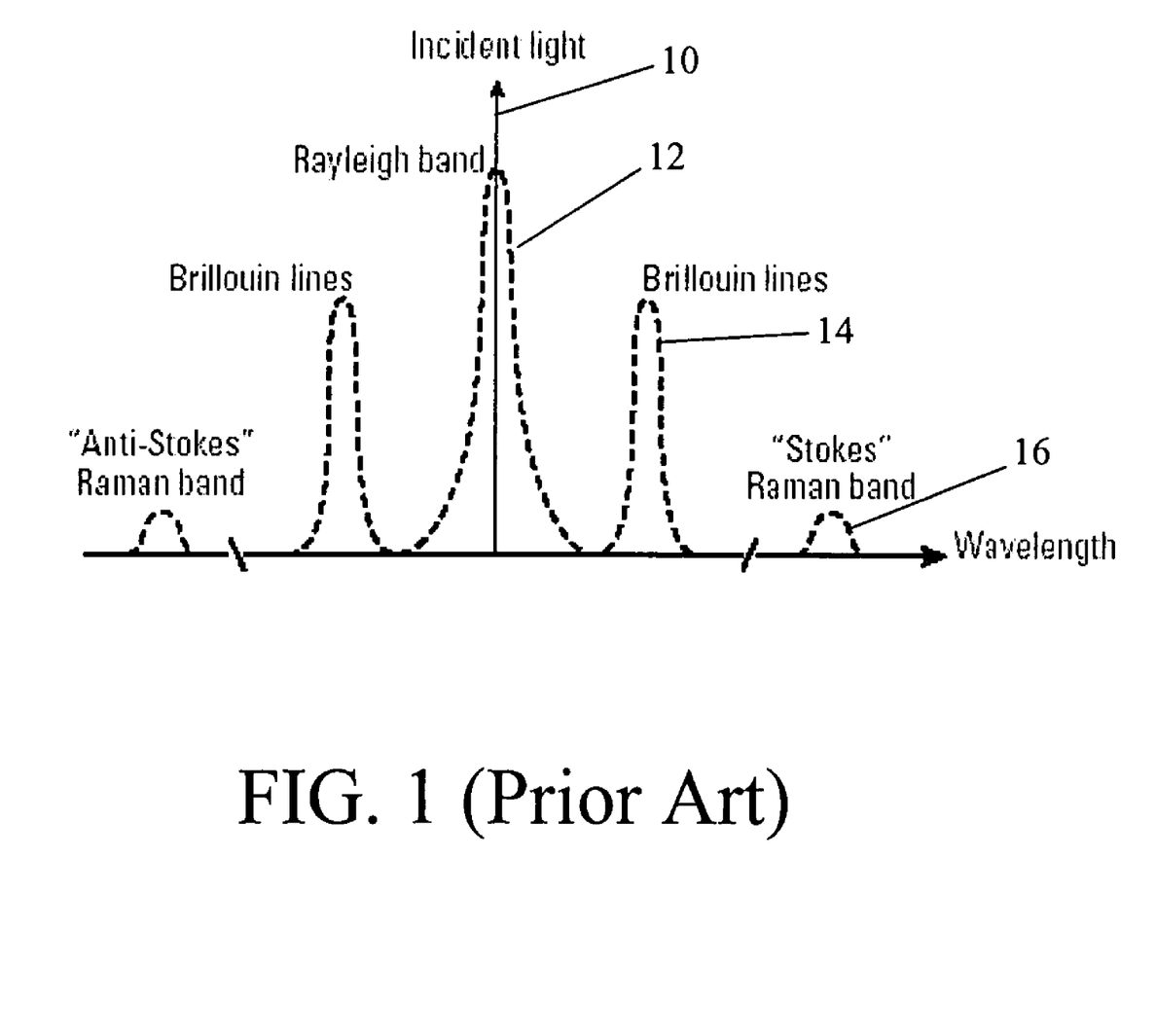
FIG. 1, as described above, is a typical spectrum of backscattered light in an optical fiber.

As shown in FIG. 1, incident light 10 propagating in an optical fiber produces backscattering in the Rayleigh band 12, Brillouin band 14 and Raman band 16. The intensity of Brillouin backscattered light 14 is much stronger, at least one order of magnitude greater, than Raman scattering 16. Therefore, Brillouin-based sensors may offer much better signal-to-noise ratio and higher dynamic range. As also shown, the Brillouin lines 14 are frequency shifted from the launch wavelength by about ten gigahertz, while the Raman lines 16 are shifted in wavelength from the launch light by about 13 THz. If a 1550-nm light source and telecommunication-grade single mode fiber are used, the Brillouin lines appear at 1549.01 (anti-Stokes) and 1550.09 nm (Stokes) while the Raman lines appear at around 1450 (anti-Stokes) and 1650 nm (Stokes). Therefore, the Brillouin lines are still in the telecommunication wavelength region, and all the low-cost fiber optic components such as an EDFA that are commercially available for the telecommunication industry can be used in Brillouin-based fiber sensors. In contrast, the Raman lines are out of the most-commonly used wavelength region for telecommunication, and fiber optic components at the Raman wavelengths are not commercially available.

Since their discovery, extensive research has been done to develop both stimulated and spontaneous Brillouin-based distributed fiber sensors. However, the complexity and high cost of current implementations has prevented widespread commercialization. Spontaneous Brillouin-based sensor techniques offer the capabilities to simultaneously sense temperature and strain with only one pulsed laser source.

When a pulsed laser is launched into a fiber, spontaneous Brillouin backscattering of the pulsed laser is detected and analyzed. The pulsed laser can be either a Q-switched laser (usually with gigahertz-linewidth) or the combination of a CW DFB laser (with 1 MHz linewidth) and an amplitude modulator (AO/EO modulator). Temperature and strain can be simultaneously measured if both the Brillouin frequency shift and the Brillouin backscattering power are determined. The backscattering signal can be measured by either direct detection or coherent detection. Coherent detection offers much higher sensitivity and dynamic range than direct detection. However, since the frequency of spontaneous Brillouin backscattering is down-shifted by approximately 11 GHz ("the Brillouin frequency shift") from that of a 1.55 µm pump light, the beat frequency (coherent self-heterodyne signal) between the spontaneous Brillouin backscattering and the pump light is extremely high and the signal lies out of the bandwidth of most commonly-used conventional heterodyne receivers, which requires expensive microwave coherent detection. Since the thermal noise power of a photo receiver is proportional to the receiver bandwidth, microwave detection suffers from low sensitivity and high noise level. To obtain an acceptable SNR (signal-to-noise ratio), the beat signal needs to be averaged over hundreds and thousands of times, which is a time-consuming process and results in measurement times of typically more than ten minutes per measurement.

Figure 2:
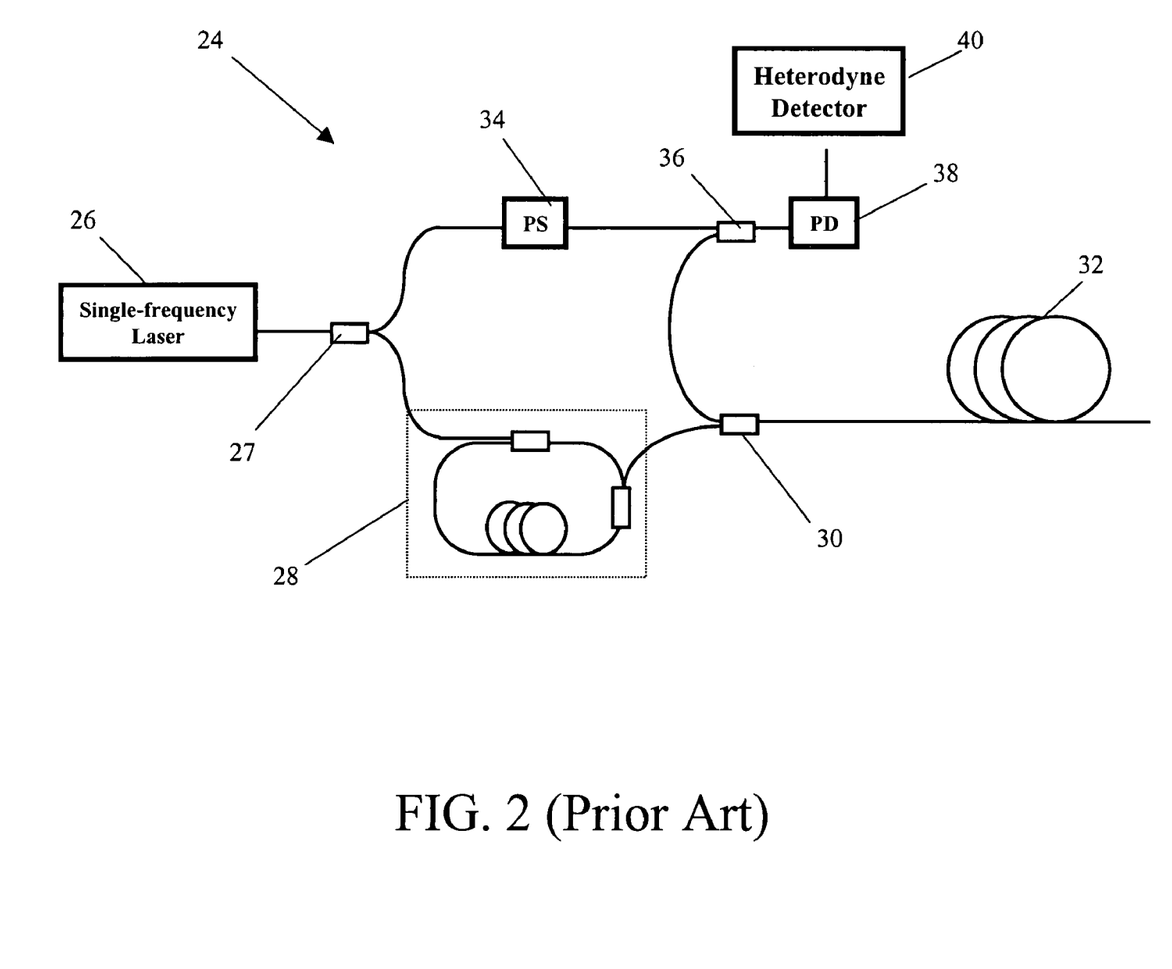
FIG. 2, as described above, is a block diagram of a known spontaneous Brillouin-based distributed fiber sensor, FIG. 3, as described above, is a block diagram of another known spontaneous Brillouin-based distributed fiber sensor.
Figure 3:
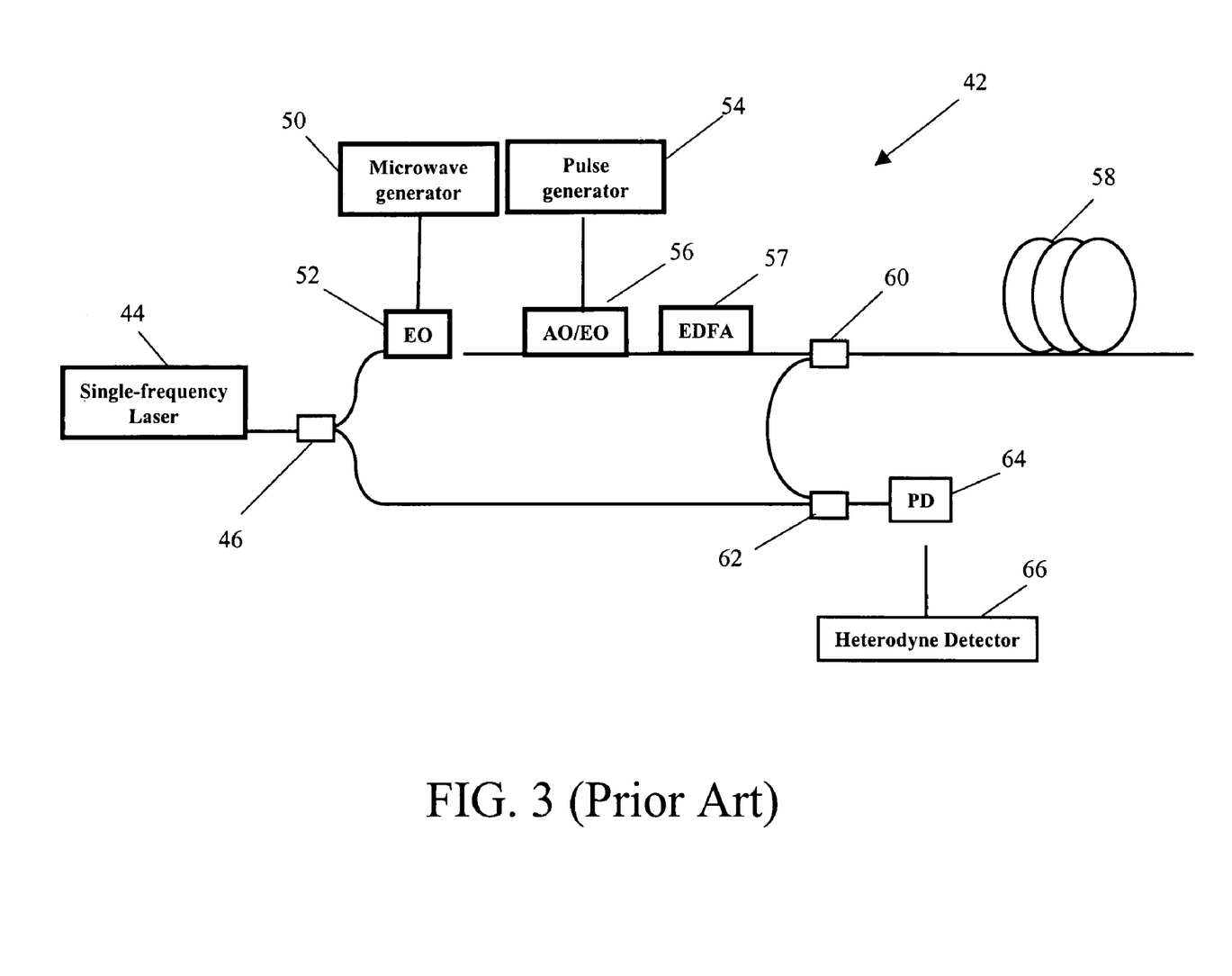

There have been some efforts to optically shift the frequency of the optical local oscillator (OLO) to set the Brillouin/OLO beat frequency within the bandwidth of a conventional heterodyne receiver. Low-frequency heterodyne detection offers not only high sensitivity, but also the opportunity of real-time data processing using low-cost commercially available electronics. These efforts include the use of a mode-locked Brillouin fiber laser 28 as shown in FIG. 2 (V. Lecoeuche et al., "Brillouin Based Distributed Fiber Sensor Incorporating a Mode-Locked Brillouin Fiber Ring Laser," *Opt. Commun.*, 152 (1998), p. 263; V. Lecoeuche et al., "25 km Brillouin Based Single-Ended Distributed Fiber Sensor for Threshold detection of Temperature or Strain," *Opt. Commun.*, 168 (1999), p. 95; and V. Lecoeuche et al., "20-km Distributed Temperature Based on Spontaneous Brillouin Scattering," *IEEE Photon. Technol. Lett.*, 12 (2000), p. 1367) and a high-speed electro-optic (EO) phase modulator 52 as shown in FIG. 3 (H. Izumita et al., "Brillouin OTDR Employing Optical Frequency Shifter Using Side-Band Generation Technique with High-Speed LN Phase Modulator," *IEEE Photon. Technol. Lett.*, 8 (1996), p. 1674; and M Nikles et al., "Simple Distributed Fiber Sensor Based on Brillouin Gain Spectrum Analysis," *Opt. Lett.*, 21 (1996), p. 758).

As shown in FIG. 2, a spontaneous Brillouin distributed fiber sensor 24 includes a single-frequency laser 26 whose output is split into two beams by a fiber coupler 27. One beam is used to pump a mode-locked Brillouin fiber ring laser 28. The ring laser's pulsed output is sent to a sensing fiber 32 through a fiber coupler 30. The back-scattered spontaneous Brillouin scattering light is directed to optically mix with an OLO beam through two fiber couplers 30 and 36. The second beam from the single-frequency laser 26 is used as the OLO. After going through a polarization scrambler 34, the OLO is mixed with the back-scattered signal. The coherent beat signal is detected with a photo detector 38 and analyzed by heterodyne detection electronics 40.

The mode-locking behavior of mode-locked Brillouin fiber ring laser 28 originates from highly unstable periodic intensity modulation of both pump laser and the Brillouin laser. Since the Brillouin gain bandwidth in fiber is on the order of tens MHz, the cavity length of a mode-locked Brillouin laser needs to be hundreds to thousands meters so that multiple longitudinal modes can oscillate within the gain bandwidth at the same time. Thus, it is practically impossible to prevent the pump laser field circulating inside the Brillouin laser cavity from intensity fluctuation because of the finite linewidth or phase noise of the pump laser. This is true even when there is an active stabilization of the Brillouin cavity length. As a result, the mode-locked Brillouin fiber laser also suffers from intensity fluctuation.

As shown in FIG. 3, a spontaneous Brillouin distributed fiber sensor 42 includes a single-frequency laser 44 whose output is split into two beams by a fiber coupler 46. One beam is phase modulated by an EO modulator 52 and its driver 50 to generate microwave side-bands. The EO modulator's phase-modulated output is amplitude-modulated by another AO/EO modulator 56 and its driver 54. After boosting the optical power by an Er-doped fiber amplifier 57, the beam is sent to a sensing fiber 58 through a fiber coupler 60. The back-scattered spontaneous Brillouin scattering light is sent to optically mix with an OLO beam through two fiber couplers 66 and 62. A second beam from the single-frequency laser 44 is used as the OLO. The OLO is mixed with the back-scattered signal. The coherent beat signal is detected with a photo detector 64 and analyzed by heterodyne detection electronics 66.

The use of a high-speed EO phase modulator provides a very simple alternative to generate a frequency-shifted OLO. However, there are several fundamental issues associated with this approach. First, since one of the side-band frequency components is used as the OLO in this approach, the performances (such as frequency stability and repeatability, phase noise, conversion efficiency) of the OLO have dominant influence on measurement accuracy and sensitivity, and dynamic range in coherent detection. Thus, the OLO performances are dramatically dependent on performances of a microwave generator 50 or synthesizer that drives the phase modulator 52. In practice, it is extremely difficult to obtain microwave drive signals with excellent performance. Second, the high-order side-band components make the signal analysis more complex because of signal interference between the high-order components and Rayleigh/Brillouin backscattering. Finally, conventional EO modulators allow only limited modulation depths (or limited conversion efficiency from the carrier to sidebands); optically carried signals decompose over low-level sidebands and a strong optical carrier, which can easily saturate a detector in coherent detection.

Although spontaneous Brillouin-based sensors have shown considerable potential advantages over conventional Raman-bases sensors, the barriers in the current implementations to a low cost system capable of real time sensing continue to inhibit commercialization.

SUMMARY OF THE INVENTION

The present invention provides a low cost spontaneous Brillouin-based distributed fiber sensor that optically shifts the frequency of the OLO to set the Brillouin/OLO beat frequency within the bandwidth of a conventional heterodyne receiver without the deficiencies of existing implementations. The distributed fiber sensor is capable of real-time measurement of both temperature and strain.

This is accomplished with a fiber laser that generates a single-frequency output having a narrow linewidth that is split into two beams. An EO modulator amplitude modulates one beam to launch pulsed-light into a sensing fiber generating spontaneous down-shifted Brillouin scattering with a first Brillouin frequency shift. A continuous wave Brillouin fiber ring laser is pumped by the second beam and generates a second single-frequency output that is down-shifted by a second Brillouin frequency shift to function as the optical local oscillator (OLO). A low-frequency heterodyne detector mixes the OLO with the Stokes component of the spontaneous Brillouin scattering and detects both temperature and strain from the mixed optical signal. The mixed optical signal has a beat frequency of approximately 100-500 MHz, which is determined by the offset in the first and second Brillouin frequency shifts.

In one embodiment, the fiber laser generates a linearly-polarized output that is used to pump a high-finesse Brillouin fiber ring cavity via a polarization-maintaining (PM) directional fiber coupler. The fiber ring resonator is made of polarization-maintaining (PM) fiber, and the polarization orientation of the linearly-polarized pump fiber laser is aligned to one of the two eigen-axis of the PM fiber. The Brillouin fiber ring laser has a cavity length of about 10-20 meters so that only one longitudinal mode can oscillate within the gain. The ring cavity is locked to the pump frequency of the fiber laser through a PZT actuator bond on the fiber in the ring cavity to stabilize its output. The output of the Brillouin fiber ring laser can be extracted through either an intracavity PM coupler or a PM circulator outside the ring cavity.

In another embodiment, the low frequency coherent detection is implemented with a frequency-to-voltage converter. One example of such a frequency-to-voltage converter is a combination of a high-pass filter, signal amplifier, and a low-pass filter. The transition band of the high-pass filter is used to linearly attenuate the beat signal as a function of beat frequency. After amplification, the low-pass filter, whose pass frequency is lower than the beat frequency, removes modulation in the beat signal.

In yet another embodiment, the fiber laser is constructed by two fiber Bragg gratings (FBG) that are fusion spliced to a few cm long piece of the active fiber (Er:Yb co-doped fiber). One FBG is written into polarization maintaining (PM) fiber, which is used as the output coupler. The fiber birefringence splits the reflection peak and since only one of the two peaks spectrally overlaps with the reflection of the other high-reflectivity FBG, optical feedback is realized for a single polarization. The fiber laser is excited by a single-mode pump laser with a maximum output power of 500 mW at 976 nm through one of the FBG's, and it can deliver single frequency radiation with more than 100 mW of output power with spectral linewidth of less than 5 kHz.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a low cost spontaneous Brillouin scattering-based distributed fiber sensor that is capable of real-time measurement of both temperature and strain. The use of a Brillouin fiber ring laser to optically shift the frequency of the OLO to set the Brillouin/OLO beat frequency within the bandwidth of a conventional heterodyne receiver avoids the deficiencies of existing implementations.

Figure 4:
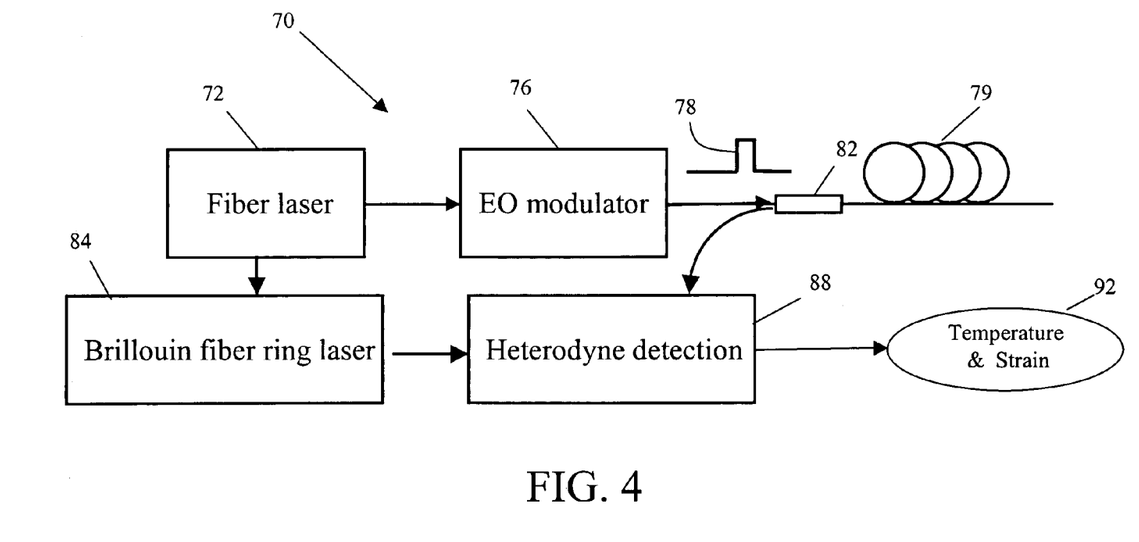
FIG. 4 is a block diagram of a spontaneous Brillouin-based distributed fiber sensor in accordance with the present invention.
Figure 5:
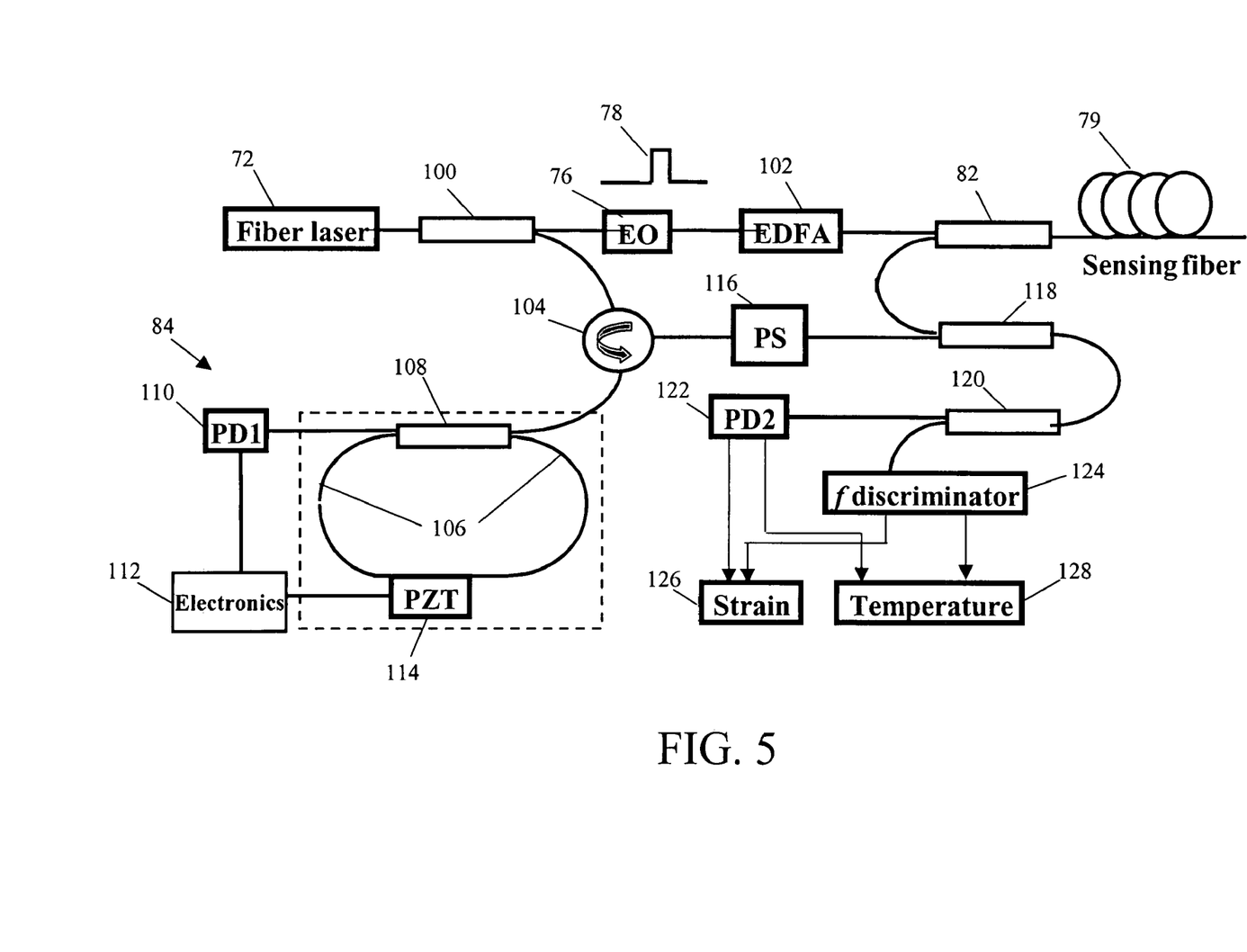
FIG. 5 is a schematic diagram of the spontaneous Brillouin-based distributed fiber sensor shown in FIG. 4.
Figure 6:
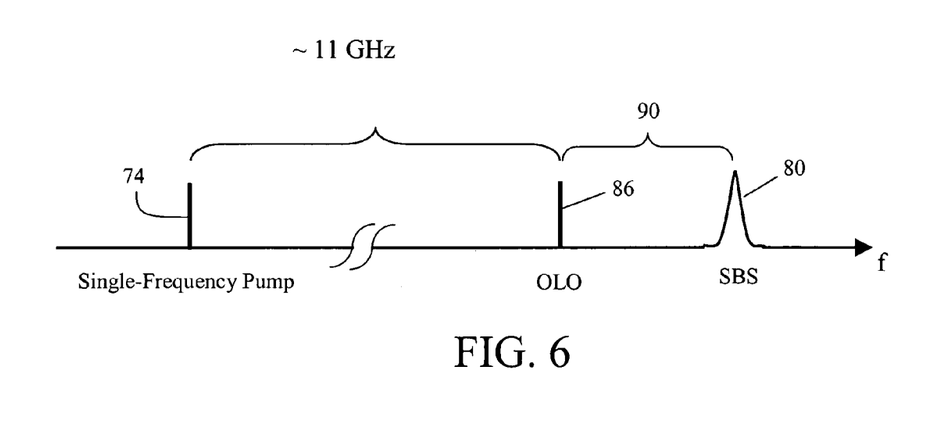
FIG. 6 is a plot of the single-frequency output of the fiber laser, the single-frequency output of the ring laser, and the spontaneous Brillouin scattering from the sensing fiber.

As shown in FIGS. 4 and 5, a spontaneous Brillouin-based distributed fiber sensor 70 includes a fiber laser 72 that generates a single-frequency output 74 having a narrow linewidth suitably centered on a wavelength in the range of 1.3 to 1.5 microns. An electro-optic (EO) modulator 76 amplitude modulates the single-frequency output to launch pulsed light 78 into a sensing fiber 79 (up to many kilometers in length) generating spontaneous Brillouin scattering (SBS) 80 with a first Brillouin frequency shift (≈11 GHz). Light is coupled in and out of the sensing fiber via a fiber coupler 82. A continuous wave Brillouin fiber ring laser 84 is pumped by the fiber laser and generates a second single-frequency output that is down-shifted frequency by a second Brillouin frequency shift to function as the optical local oscillator (OLO) 86. A low-frequency heterodyne detector 88 mixes the OLO 86 with the Stokes component of the spontaneous Brillouin scattering 80 to produce a mixed optical signal 90 having a beat frequency of approximately 100-500 MHz determined by the offset in the first and second Brillouin frequency shifts and detects both temperature and strain properties 92 from the mixed optical signal.

The offset between the SBS 80 and OLO 86 can range from near zero to hundreds of MHz depending on the similarity of the sensing fiber 79 and the fibers used in the Brillouin fiber ring laser 84. The amount of offset determines the dynamic range of the temperature measurement at a rate of about 1 MHz/degree or the strain measurement at a rate of about 0.05 MHz/µε. An offset of about 100-500 MHz provides sufficient resolution to make unambiguous measurements of the change in the temperature and strain properties 92 in the sensing fiber but is low enough to use conventional heterodyne detectors.

A more detailed implementation of the spontaneous Brillouin-based DFS 70 is illustrated in FIGS. 5-8. A Fiber laser 72 generates the single-frequency output 74. A fiber splitter 100 splits the output into a pair of beams. An EO modulator 76 amplitude modulates the first beam to generate pulsed light 78 that is amplified by an erbium doped fiber amplifier (EDFA) 102 and launched into a sensing fiber 79 generating spontaneous Brillouin scattering (SBS) 80 with a first Brillouin frequency shift (≈11 GHz). Light is coupled in and out of the sensing fiber via a fiber coupler 82.

The CW Brillouin fiber ring laser 84 is pumped by the fiber laser's second beam, which is optically coupled via a circulator 104. CW Brillouin fiber ring lasers are well known. The nonlinear interactions between the laser optical fields and an acoustic wave result in Brillouin scattering process in an optical medium (fiber). The laser field (pump field) generates an acoustic wave through the process of electrostriction. The acoustic wave in turn modulates the refraction index of the medium. This pump-induced index grating scatters the pump light through Bragg diffraction. Scattered light is downshifted in frequency because of the Doppler shift associated with a grating moving at the acoustic velocity. When the pump light propagates in the medium, Brillouin gain at the shifted frequency can be established in the medium.

The Brillouin gain in optical fibers can be used to make lasers by placing the fiber inside a cavity. Most Brillouin fiber lasers use a ring cavity to avoid generation of multiple Stokes lines through cascaded SBS. The performance of a Brillouin ring laser depends on the fiber length used to make the cavity. For short fibers (~10-20 m), the cavity free spectral range (FSR) is close to the bandwidth of the Brillouin gain of the fiber. As a result, the ring laser can operate stably in a single longitudinal (single-frequency) mode.

The preferred single-frequency Brillouin fiber ring laser 84 is made entirely of fiber and the fiber components 106 are polarization-maintaining. The cavity length is less than 20 meters. A PM directional fiber coupler 108 couples the pump beam from the circulator 104. A portion of the pump beam is tapped and a photodiode 110 detects the interference signal of the pump beam circulating inside the ring cavity and converts it into an electrical signal. Electronics 112 process the signal and control a PZT actuator 114 that strains the fiber 106 to lock the frequency of the ring cavity to the pump frequency. The output of the Brillouin fiber ring laser is extracted via the PM circulator 104 outside the ring cavity.

The ring laser 84 generates a second single-frequency output that is down-shifted in frequency by a second Brillouin frequency shift that to function as the optical local oscillator (OLO) 86. The OLO is directed through circulator 104 to a polarization scrambler 116. The polarization scrambled OLO and Stokes component of the SBS signal are combined in a 3 dB coupler 118. The optically-mixed beam 90 is split into two beams by a fiber coupler 120 in order to measure both power and frequency shift of the SBS/OLO beat signal. A photodiode 122 measures the power or intensity of the beat signal from one of the beams. A frequency discriminator 124 measures the frequency shift from the other beam. The power and frequency shift measurements are used to determine both strain 126 and temperature 128. This calculation is well-known. Taken together the couplers 118 and 120, photodiode 122 and frequency discriminator 124 provide the heterodyne detector 88. This topology allows the photodiode 122 and frequency discriminator 124 to use only low-frequency components with a bandwidth of less than 500 MHz.

Figures 7A, 7B:
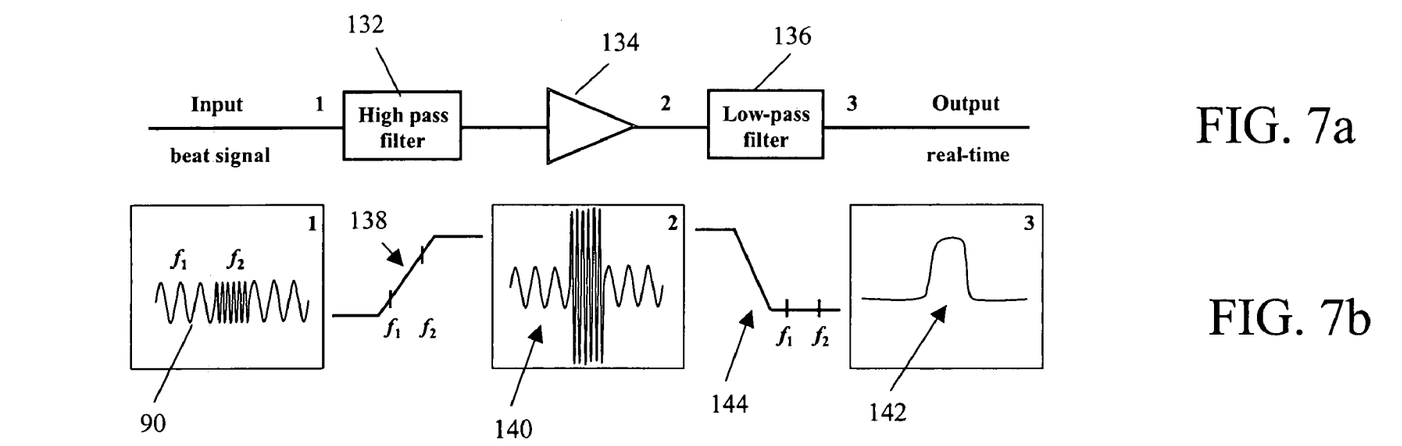
FIGS. 7a and 7b are a block diagram and frequency-to-voltage converter implementation of the heterodyne detector.

The frequency discriminator 124 can be implemented as a frequency-to-voltage converter 130 of the type illustrated in FIGS. 7a and 7b, which provides for real-time measurement of the Brillouin/OLO beat frequencies ($f_1$ and $f_2$) in the optically mixed beam 90. The converter includes a high-pass filter (HPF) 132, a gain element 134 and a low-pass filter (LPF) 136. The cut-off frequency 138 of the high-pass filter is set at ~500 MHz. If the Brillouin/OLO beat frequency is within the range 50–500 MHz, which corresponds to about 500° C. temperature range of measurement or a 1% range of fiber elongation, the beat frequency is amplified 140 and linearly converted to a voltage 142 in real time by the filter. On the other hand, most noises in the system, such as laser intensity noise, are far below 50 MHz, and the HPF will reject them. Since the cut-off frequency 144 of the LPF 136 is lower than the beat frequency, signal modulation at the beat frequency (and any noise at frequencies higher than the cut-off frequency of the LPF) is rejected by the LPF, while retaining the slowly varying envelope (voltage) of the signal that is proportional to the beat frequency.

Although the described topology eliminates many of the problems associated with prior efforts to optically shift the frequency of the OLO to set the Brillouin/OLO beat frequency within the bandwidth of a conventional heterodyne receiver, the performance of the distributed fiber sensor, i.e. its sensitivity to changes in temperature and strain, is limited by the characteristics of pump fiber laser 72. To achieve optimum performance, the fiber laser must deliver a high power, stable, single-frequency output with narrow linewidth. A suitable laser is described by Spiegelberg et al., "Compact 100 mW fiber laser with 2 kHz linewidth" Optical Fiber Communications Conference, 2003. OFC 2003, 23-28 Mar. 2003 Pages: PD45-1-PD45-3.

Figure 8A:
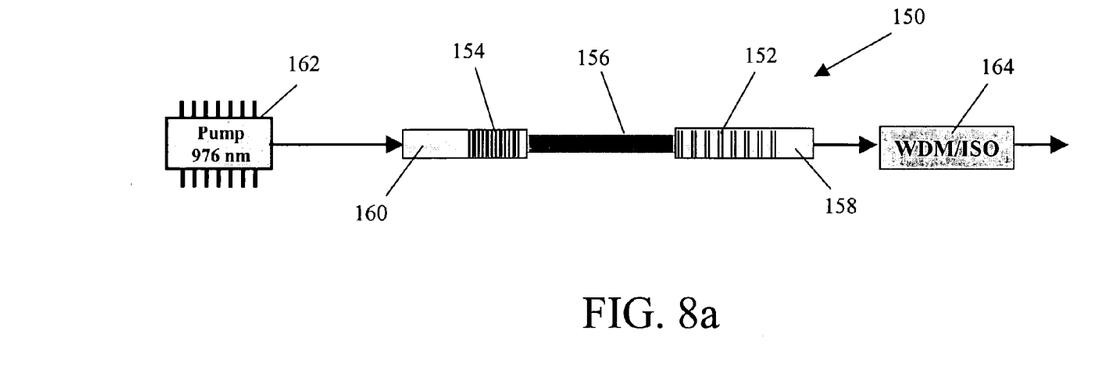
FIGS. 8a and 8b are a block diagram of an implementation of the single-frequency fiber laser and it single-mode output.

As shown in FIG. 8*a*, an exemplary single-frequency fiber laser 150 is constructed by two fiber Bragg gratings (FBG) 152, 154 that are fusion spliced to a few cm long piece of the active fiber 156 (Er:Yb co-doped phosphate-glass fiber). Single-mode fiber made of phosphate glass co-doped with 1-5 wt. % Er oxide and 1-5 wt. % Yb oxide exhibits extremely high optical gain per unit length of up to 5 dB/cm with negligible ion clustering and is uniquely suited for short linear single-frequency fiber lasers. The phosphate glass host suitably comprises a phosphate glass $P_2O_5$ from 30 to 80 wt. %, $L_2O_3$ from 5 to 30 wt. %, and MO from 5 to 30 wt. %, where MO is selected from BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

Figure 8B:
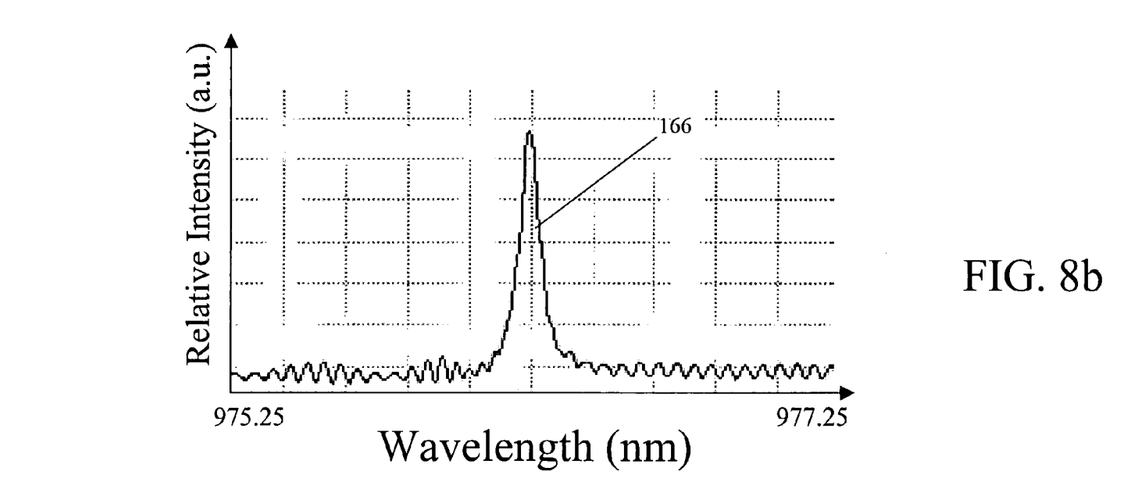

The single-frequency laser cavity is formed with one partially reflective FBG 152 that is written into polarization maintaining (PM) fiber 158, suitably passive silica fiber, and fusion spliced to active fiber 156. The FBG also functions as the output coupler. The fiber birefringence splits the reflection peak and since only one of the two peaks spectrally overlaps with the reflection of the other high-reflectivity FBG 154 written on a fiber 160, suitably passive silica fiber, optical feedback is realized for a single polarization. The fiber laser is excited by a pump laser 162, suitably single-transverse mode with an output power of 500 mW around 976 nm, through FBG 154 and delivers single frequency radiation with a narrow linewidth. A combination of PM WDM and isolator (ISO) 164 is used to dump the residual pump light and to prevent any back-reflection of light into the fiber laser cavity. As shown in FIG. 8*b*, the fiber laser can deliver single frequency radiation 166 with more than 100 mW of output power with a spectral linewidth of less than 5 kHz.

If the single-frequency fiber laser 150 is packaged to effectively decouple it from the external environment, the laser's frequency noise and heterodyne linewidth in the relevant frequency range are dominated by pump laser noise. The main contribution to the pump laser noise originates from fast longitudinal mode competition in conventional FBG-stabilized single-transverse mode pump diodes. By using a pump laser 162, either semiconductor diode laser or another fiber laser, that is both transversely and longitudinally single-mode to excite the single-frequency fiber laser, the fiber laser's 3 dB heterodyne linewidth can be further reduced from about 5 kHz to less than 1 kHz. The coherence length can be expanded from about 50 km to more than 300 km as has been demonstrated.

Figure 9:
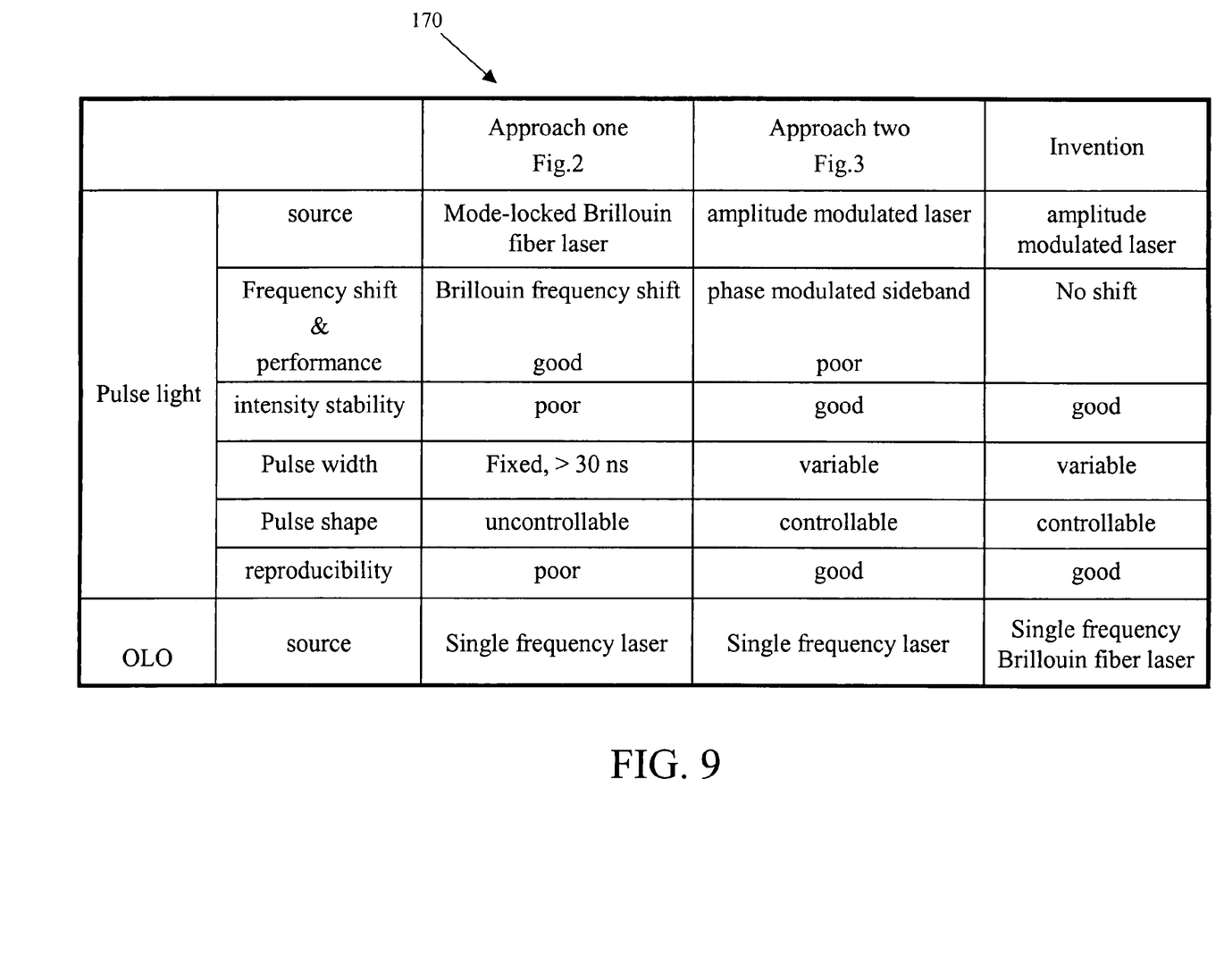
FIG. 9 is a table comparing the distributed fiber sensor system of the present invention with known implementations of spontaneous Brillouin based systems.

A comparison of the two known spontaneous Brillouin-based distributed fiber sensor topologies, discussed above with respect to FIGS. 2 and 3, for optically shifting the frequency of the OLO to set the Brillouin/OLO beat frequency within the bandwidth of a conventional heterodyne receiver with the current invention is provided in table 170 in FIG. 9. As compared to the first approach, the current invention uses an amplitude-modulated laser as the source and a single-frequency Brillouin fiber ring laser as the OLO. By avoiding the issues of using a mode-locked Brillouin fiber laser as the source, the current invention has much improved performance. As compared to the second approach, the invention uses a single-frequency Brillouin fiber ring laser as the OLO instead of a conventional single frequency laser. The primary performance disadvantage of the second approach is the difficulty in obtaining a high-performance microwave phase-modulated side-band component, and the complexity in signal analysis due to existence of signal interference between the high-order components and Rayleigh/Brillouin backscattering.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A distributed fiber sensor (DFS), comprising:
 a sensing fiber having a Brillouin gain;
 a laser that generates a single-frequency output that is split into first and second beams;
 a modulator that amplitude modulates the first beam to launch pulsed light into the sensing fiber generating spontaneous Brillouin scattering with a first Brillouin frequency shift;
 a continuous wave Brillouin fiber ring laser that is pumped by the second beam and generates a single-frequency output that is down-shifted by a second Brillouin frequency shift; and
 a heterodyne detector that mixes the ring laser's single-frequency output with the Stokes component of the spontaneous Brillouin scattering and measures temperature and strain from the mixed optical signal.

2. The DFS of claim 1, wherein the mixed optical signal has a beat frequency of 100-500 MHz determined by an offset in the first and second Brillouin frequency shifts.

3. The DFS of claim 2, wherein the heterodyne detector has a bandwidth of 500 MHz or less.

4. The DFS of claim 3, wherein the heterodyne detector comprises a photodiode and a frequency-to-voltage converter.

5. The DFS of claim 1, wherein the heterodyne detector measures temperature and strain in real-time.

6. The DFS of claim 1, wherein the fiber laser generates a linearly-polarized output, said Brillouin fiber ring laser comprising polarization-maintaining (PM) fiber that is aligned to the linearly-polarized second beam.

7. The DFS of claim 1, wherein the Brillouin fiber ring laser has a cavity of 10-20 meters in length.

8. The DFS of claim 1, wherein the Brillouin fiber ring laser comprises a PZT actuator that lock's its frequency to the frequency of the second beam.

9. The DFS of claim 1, wherein the laser comprises an Er:Yb co-doped phosphate glass active fiber.

10. The DFS of claim 9, wherein the laser comprises a single-transverse mode pump laser or a single-transverse and single-longitudinal mode pump laser that excites Er and Yb dopants in the active fiber.

11. A distributed fiber sensor (DFS), comprising:
a sensing fiber having a Brillouin gain;
a laser that generates a single-frequency linearly-polarized output that is split into first and second beams;
a modulator that amplitude modulates the first beam to launch pulsed light into the sensing fiber generating spontaneous Brillouin scattering with a first Brillouin frequency shift;
a continuous wave Brillouin fiber ring laser comprising a cavity 10-20 meters in length of polarization-maintaining (PM) fiber that is aligned to the linearly-polarized second beam that pumps the cavity to generate a single-frequency output that is down-shifted by a second Brillouin frequency shift; and
a heterodyne detector that mixes the ring laser's single-frequency output with the Stokes component of the spontaneous Brillouin scattering and measures temperature and strain from the mixed optical signal.

12. The DFS of claim 11, wherein the mixed optical signal has a beat frequency of 100-500 MHz determined by an offset in the first and second Brillouin frequency shifts and the heterodyne detector has a bandwidth of 500 MHz or less.

13. The DFS of claim 11, wherein the heterodyne detector comprises a photodiode and a frequency-to-voltage converter.

14. The DFS of claim 11, wherein the Brillouin fiber ring laser comprises a PZT actuator that lock's its frequency to the frequency of the second beam.

15. A distributed fiber sensor (DFS), comprising:
a sensing fiber having a Brillouin gain;
a fiber laser including an Er:Yb co-doped phosphate glass active fiber that is excited with a single mode pump to generate a single-frequency output that is split into first and second beams;
a modulator that amplitude modulates the first beam to launch pulsed light into the sensing fiber generating spontaneous Brillouin scattering with a first Brillouin frequency shift;
a continuous wave Brillouin fiber ring laser that is pumped by the second beam and generates a single-frequency output that is down-shifted by a second Brillouin frequency shift; and
a heterodyne detector that mixes the ring laser's single-frequency output with the Stokes component of the spontaneous Brillouin scattering and measures temperature and strain from the mixed optical signal.

16. The DFS of claim 15, wherein the fiber laser generates linearly-polarized first and second beams, said Brillouin fiber ring laser comprising polarization-maintaining (PM) fiber that is aligned to the linearly-polarized second beam.

17. The DFS of claim 15, wherein the Brillouin fiber ring laser has a cavity of 10-20 meters in length.

18. The DFS of claim 15, wherein the Brillouin fiber ring laser comprises a PZT actuator that lock's its frequency to the frequency of the second beam.

19. The DFS of claim 15, wherein the single-mode pump is both single-transverse and single-longitudinal mode.

* * * * *